(12) United States Patent
Masse et al.

(10) Patent No.: US 8,683,069 B2
(45) Date of Patent: Mar. 25, 2014

(54) METHOD FOR BROADCASTING A DATA STREAM BASED ON TIME LAG IN A NETWORK INCLUDING A PLURALITY OF TRANSMITTERS, COMPUTER PROGRAM PRODUCT, HEAD-END SYSTEM FOR IMPLEMENTING SAID METHOD

(75) Inventors: Denis Masse, Metz (FR); Jean-Francois Travers, Pace (FR); Michel Richard, Cheminot (FR)

(73) Assignee: TDF, Montrouge Cedex (FR)

( * ) Notice: Subject to any disclaimer, the term of this patent is extended or adjusted under 35 U.S.C. 154(b) by 683 days.

(21) Appl. No.: 12/735,831

(22) PCT Filed: Feb. 11, 2009

(86) PCT No.: PCT/EP2009/051561
§ 371 (c)(1),
(2), (4) Date: Nov. 15, 2010

(87) PCT Pub. No.: WO2009/103638
PCT Pub. Date: Aug. 27, 2009

(65) Prior Publication Data
US 2011/0055414 A1    Mar. 3, 2011

(30) Foreign Application Priority Data
Feb. 19, 2008 (FR) .................................... 08 51047

(51) Int. Cl.
*G06F 15/16* (2006.01)
(52) U.S. Cl.
USPC ............................ 709/231; 455/500; 455/502
(58) Field of Classification Search
USPC .................................. 709/231; 455/500, 502
See application file for complete search history.

(56) References Cited

U.S. PATENT DOCUMENTS 6,011,977 A    1/2000 Brown et al.

FOREIGN PATENT DOCUMENTS

| EP | 975168 A1 * | 1/2000 |
| EP | 1041758 A2 | 4/2000 |
| WO | 9325012 A1 | 12/1993 |
| WO | 9612360 A1 | 4/1996 |
| WO | 2006046107 A1 | 5/2006 |
| WO | 2006084361 A1 | 8/2006 |

OTHER PUBLICATIONS

International Search Report dated Jun. 8, 2009 for corresponding International Application No. PCT/EP2009/051561, filed Feb. 11, 2009.

(Continued)

*Primary Examiner* — Mohamed Wasel
(74) *Attorney, Agent, or Firm* — David D. Brush; Westman, Champlin & Koehler, P.A.

(57) ABSTRACT

A method is provided for broadcasting a data stream in a network including at least two separate transmitters supplied by a head end. The stream is organized into data frames and includes at least one time marker. The method includes the following steps at the head end: obtaining a first time reference from an external source; obtaining a second time reference from the data stream received by the head end; comparing the first and second time references in order to determine a time shift between the first and second time references; and transmitting the time shift or at least one time marker modified on the basis of the time shift in order to compensate for a transport time variation between the head end and the transmitters.

15 Claims, 8 Drawing Sheets

(56) References Cited

OTHER PUBLICATIONS

Digital Video Broadcasting (DVB); DVB-SH Implementation Guidelines TM3731 Revision 3, TM-SSP252 Revision 9—pp. 149-151 (v Jan. 2008).

"Building Next-Generation Digital Terrestrial Network" Fiche Produit NetInsight.
English Translation of International Preliminary Report of Patentability and Written Opinion dated Jun. 8, 2009 for corresponding International Application No. PCT/EP2009/051561, filed Feb. 11, 2009.

* cited by examiner

METHOD FOR BROADCASTING A DATA STREAM BASED ON TIME LAG IN A NETWORK INCLUDING A PLURALITY OF TRANSMITTERS, COMPUTER PROGRAM PRODUCT, HEAD-END SYSTEM FOR IMPLEMENTING SAID METHOD

CROSS-REFERENCE TO RELATED APPLICATIONS

This application is a Section 371 National Stage Application of International Application No. PCT/EP2009/051561, filed Feb. 11, 2009 and published as WO 2009/103638 on Aug. 27, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission and broadcasting of digital data, in particular television or radio data, in a communication network including a plurality of transmitters.

More precisely, the disclosure relates to synchronising the transmitters of such a network.

The disclosure applies more particularly, but not exclusively, to SFN networks (Single Frequency Networks), irrespective of the broadcasting standard used:
- DVB-T or DVB-T2 (Digital Video Broadcasting-Terrestrial);
- DVB-H (Digital Video Broadcasting-Handheld);
- DAB (Digital Audio Broadcasting);
- DMB (Digital Multimedia Broadcasting);
- WiMAX (Worldwide Interoperability for Microwave Access);
- Etc.

For example, the disclosure falls within the context of the ISO/IEC standard 13818-1 relating to MPEG-TS (Motion Picture Expert Group-Transport Stream) multiplexes.

BACKGROUND OF THE DISCLOSURE

In the continuation of this document, effort will be made more particularly to describe an existing set of problems in the field of digital terrestrial television broadcasting networks. The disclosure is of course not limited to this particular field of applications, but is of interest in any data transmission or broadcasting technique having to confront a close or similar set of problems, and particularly in broadcasting networks implementing the DVB-T or DVB-H standard.

Digital terrestrial television networks, also called DTT, which implement the DVB-T or DVB-H standard, are today deployed in France, in Europe and in other countries of the world. For the most part, these networks are of the MFN type (Multi-Frequency Network), which means that the various transmitters of such a network operate at separate frequencies. Conversely, in some geographic regions, the networks are of the SFN or isochronous type, which means that the various transmitters must be synchronised precisely in terms of time, frequency and content.

As a matter of fact, the operating principle of such SFN networks can consist in transmitting a single signal from at least two separate geographic sites at each of which a transmitter is located. The sought-after objective is then to add the contribution of these two signals in reception, which requires them to be received at the same instant, within a guard time based on the modulation profile and proportional to the symbol time width, and at the same frequency, in order to prevent them from interfering with one another. Based on the geographic distance of the receiver from each of the two transmitters, it is therefore sometimes necessary to take account of the different transport times of the signals, and more generally the propagation channel and the interferences that it is likely to introduce.

Due to this requirement for time and frequency synchronisation of the various transmitters, the implementation of such SFN networks proves to be particularly difficult.

Several methods have thus far been proposed for enabling DVB-T output signals from the transmitters of a DTT broadcasting network to be synchronised, which, for the most part, are based on time marking the data frames to transmit, as shown below in connection with FIG. 1. Such a marking method is standardised, and, for more information about this method, reference may be made to the standard referenced as ETSI TS 101 191.

In accordance with this standard, FIG. 1 shows a block diagram of a SFN-type digital terrestrial television broadcasting system implementing data broadcasting in the MPEG-2-TS format (Motion Picture Expert Group-Transport Stream).

Two transmitters 10 and 11 are shown in FIG. 1, which each include synchronisation equipment (SYNC system) 101, 111, and a DVB-T modulator 102, 112. The synchronisation equipment 101, 111 is supplied with two frequency and time reference signals, e.g., a signal corresponding to one pulse per second, or 1 pps, and a signal at 10 MHz resulting from the 1 pps. It is observed that there are exactly 10 million periods of the frequency reference signal at 10 MHz between two 1 pps pulses.

These signals can be derived from any reliable reference system 105 and 115, e.g., from the American GPS (Global Positioning System) or European Galileo positioning system, or from low-frequency radio frequency carriers (DCF77 in Germany, MSF in the United Kingdom, France Inter in France, etc., which are registered trademarks).

The 10 MHz reference frequency signal can likewise be used at the head end, by an SFN adapter, in order to calibrate the output flow thereof, so that it is stable and accurate, as well as by the broadcasting transmitting station transmitters, in order to calibrate the output thereof.

This reference can likewise be used by the transmitters in order to synchronise the transmitting frequency thereof, which must be accurate to within less than 1 Hz in DTT in an SFN network for optimal operation.

The data being broadcasted by each of these transmitters 10, 11 are received in the form of a transport stream of the MPEG-2 TS type (for MPEG-2 Transport Stream), derived from a receiver 12 likewise acting as a network adapter (RX network adapter).

Upstream, at the other end of the broadcast chain, the MPEG-2 TS stream of data to transmit is constructed by an MPEG-2 multiplexer referenced as 13, which creates the data frames. Such an MPEG-2 multiplexer, for example, is situated in a national head-end, from which the data to broadcast by each of the transmitters 10, 11 of the broadcasting network is next transported via satellite (in a transport network also called a distribution network). After MPEG-2 multiplexing 13, the data is processed by an SFN adapter 14, which time-marks the frames using the same time and frequency reference system 15 as the one 105, 115 used by the synchronisation equipment 101, 111 of the transmitters 10 and 11. In the transmission, the SFN adapter 14 is the pendant of the synchronisation equipment 101, 111 in reception. In this way, the SFN adapter is also supplied with a reference frequency signal at 10 MHz and with a reference time signal at one pulse per second.

Upon exiting the SFN adapter 14, the data stream is therefore of the MPEG-2 TS type: it is then transmitted by a network adapter 16 (TX network adapter), and conveyed by means of the transport or distribution network 17 (e.g., a satellite distribution network), to the receivers 12, so as to be made available to the transmitters 10 and 11.

More precisely, the time-marking carried out by the SFN adapter 14 consists, on the one hand, in constructing mega-frames, each corresponding to 8 DVB-T frames in 8K mode, or to 32 DVB-T frames in 2K mode, and, on the other hand, in inserting, at any location of each of these mega-frames, a mega-frame initialisation packet or MIP.

The MIP packet of the mega-frame of index n, referenced as $MIP_n$, is identified by its own PID (Packet Identifier) and, in particular, includes:
- a 2-byte word called a "pointer," which provides the number of data packets (TS packets) between the current MIP and the first TS packet of the following mega-frame;
- a 3-byte word called a "Synchronisation_time_stamp", or STS, which provides the number of 10-MHz periods between the last reference 1 pps pulse preceding the beginning of the mega-frame of index n+1 and the beginning of this following mega-frame of index n+1 (identified by the first bit of the first packet of this mega-frame).

FIG. 2 illustrates these various notions precisely for:
- the output data stream of the head-end SFN adapter, referenced as 21;
- the input data stream of the modulator on the transmission site, referenced as 22; and
- the modulated signal broadcast by the transmitted, referenced as 23.

As indicated previously, the SFN adapter 14 organises the data stream 21 into mega-frames, and inserts one and only one MIP packet per mega-frame ($MIP_{n-1}$ for the mega-frame n−1, $MIP_n$ for the mega-frame n).

At the level of the transmitters 10, 11, the SYNC system module 101, 102 receives as input, on the one hand, the MPEG 22 stream which was transported in the network, and, on the other hand, the 1 pps and 10 MHz frequency reference originating, time reference example, from the GPS receiver.

It searches for the $MIP_{n-1}$ packet.

Having found the $MIP_{n-1}$ packet, and, owing to the "pointer" value, it finds the first TS packet of the following mega-frame n, referenced as $TS_{n,1}$. Bit-level synchronisation was therefore carried out.

Having found the first packet $TS_{n,1}$, the SYNC system module 101, 102, owing to the STS value and to the 1 pps pulse, determines at which moment this first TS packet of the following mega-frame exited the head-end SFN adapter. This corresponds to the transport delay (or time).

Finally, the SYNC system module 101, 102 deduces therefrom the moment of broadcasting, which corresponds to the moment of output from the head-end SFN adapter, to which a controlled delay common to all of the transmitters of the transmission sites is added (maximum delay or "Max_Delay,", which is likewise transported in the MIP packets), as well as a delay which may be specific to each transmitter ("Tx_time_offset").

In other words, the transmitters 10, 11 use MIP signalling and a time reference (e.g., a 1 pps signal), which is identical to that used at the head-end transmitter level, in order to carry out a comparative analysis of the MIP signalling and the STS time stamps, and to take the decision to more or less delay the frame received as output from the transmitter of the transmission site. In this way, this deterministic method, which is based on the same 1 pps time reference as at the head-end, ensures the time synchronisation of the signals output by the transmitters of the transmitting sites.

However, this synchronisation is only possible if, on the one hand, the transport time is less than the Max_Delay value (itself less than one second if a 1 pps time reference is used), and, on the other hand, if the 1 pps time references "pulse," i.e., emit a pulse at the same moment in the various transmissions sites.

It is therefore necessary for the 1 pps time reference and 10 MHz frequency reference to be common at all points of the broadcast chain. They are therefore conventionally deduced from GPS data reception.

In order to reduce the cost of the equipment, attempts are currently being made to develop SFN networks which are not based on the use of GPS receivers at each transmission site.

For example, the document WO 2006/084361 proposes to insert time information into the data stream to broadcast, at the head-end level, to recover this information at each transmission site, and, from this time information, to generate a reference signal used by the various transmission sites in order to synchronise themselves.

However, this technique enables the various transmitters to be synchronised only if all of the transmissions sites use the same synchronisation technique. Consequently, this technique does not provide correct synchronisation of all the transmitters if some transmitters use a 1 pps reference generated using a GPS-type receiver, and other transmitters regenerate a reference signal from the time information carried in the broadcasted stream.

As a matter of fact, due to the variation in the position of the satellite used for transporting the data stream (MPEG-TS) from the head-end towards the various transmitting stations, the transport time between the head-end and the various transmission sites varies. For example, the transport time to a given transmitting station varies in time by approximately 270 μs, when considering a geostationary satellite situated at approximately 36,000 Km away, the position of which varying within a cube of approximately 80 Km per side.

The 1 pps time reference regenerated according to the technique of document WO 2006/084361 is therefore not synchronised with the 1 pps time reference derived from a GPS receiver. In other words, a deviation of Δ1 pps exists between the 1 pps time reference regenerated according to the technique of document WO 2006/084361 and the 1 pps time reference derived from a GPS receiver, with respect to two transmitters of a single SFN plate.

Furthermore, the movement of a satellite induces frequency variations. More precisely, due to the Doppler effect, the movement of the satellite and the speed thereof induce a jitter in the flow rate and therefore in the 10 MHz reference frequency. Consequently, the transmission frequencies of the various sites are liable to differ by a few hertz.

It therefore appears to be impossible to place within a single network, in an SFN, transmitters having time references which are not common at all points of the broadcast chain.

SUMMARY

An exemplary embodiment of the invention proposes a novel solution which does not have all of these disadvantages of the prior art. An embodiment of the invention relates to a method for broadcasting a data stream in a broadcasting network including at least two separate transmitters supplied by a head-end, said data stream being organised into data frames and including at least one time marker.

According to an embodiment of the invention, such a method implements the following steps, at the head-end level:
- obtaining a first time reference from an external source;
- obtaining a second time reference from said data stream received by said head-end;
- comparing said first and second time references so as to determine a time lag between said first and second time references;
- transmitting the time lag or at least one time marker modified on the basis of the time lag, so as to compensate for a variation in transport time between said head-end and said transmitters.

According to at least one of these embodiments, the invention thus proposes a novel technique for synchronising the various transmitters of a broadcasting network, which does not require the use of a reliable time reference (derived, for example, from a GPS receiver) in each of these transmitters.

This technique thus enables the use, within a single broadcasting network, of both transmitters using a time reference derived from a reliable source and transmitters using a time reference derived from the data stream.

For example, the first time reference is a pulse per second derived from a positioning system, and the second time reference is a pulse per second regenerated from the data stream.

More precisely, in this case, a reliable source is understood to mean a time and/or frequency reference source such as the American GPS or European Galileo positioning system, or low-frequency radio frequency carriers (DCF77 in Germany, MSF in the United Kingdom, France Inter in France, etc., which are registered trademarks).

To accomplish this, a time lag is determined between the two time references obtained in different ways, at the level of the head-end, and this time lag, or at least one time marker of the data stream modified according to this lag, is transmitted to the transmitters.

More precisely, the time lag, which, for example, is determined for a mega-frame of index n, can be taken into account in order to modify the time marker or markers later in the data stream, i.e., the time markers of the mega-frames of index n+1, of index n+2 and those following.

This modification of the time marker or markers transfer this time lag, which is due, in particular, to the variation in transport time between the head-end and a transmitter (due to the variations of the satellite), onto the modulated signal broadcasted by the transmitter.

The transport time between the head-end and the various transmitters of a single city can indeed be considered as being identical, and the transport time between the head-end and the various transmitters of a single country as being quasi-identical (a deviation of less than 5 µs).

It is likewise possible to transmit this time lag to the various transmitters, which will use it in order to compensate for the variation in transport time between the head-end and the transmitter.

In particular, the time marker bears a synchronisation time stamp (STS).

According to a first embodiment of the invention, the modified time marker or markers carry (carries) a value representative of the time lag and said synchronisation time stamp (STS).

In other words, the time markers are modified by adding the time lag to the value of the time stamp.

According to a second embodiment of the invention, the broadcasting method includes a step of pre-distorting the first time reference by adding said time lag thereto.

The modified time marker or markers then carry a value representative of the pre-distorted time reference and said synchronisation time stamp (STS).

In other words, the modified time markers carry the value of said stamp modified on the basis of the pre-distorted time reference.

Furthermore, the broadcasting method can include a step of obtaining a frequency reference from said first time reference, and a step of pre-distorting said frequency reference on the basis of said time lag.

According to a third embodiment of the invention, the broadcasting method includes a step of determining a pre-distorted time reference from said frequency reference.

The modified time marker or markers then carry a value representative of the pre-distorted time reference and said synchronisation time stamp (STS).

The value of said stamp is thus modified on the basis of said pre-distorted time reference.

According to a fourth embodiment of the invention, the time lag is transmitted to said transmitters via an external transmitting means.

For example, this external transmitting means implements an external link, such as a GPRS, WIMAX, etc. link using a data transmission protocol, such as e.g., the IP protocol.

The time lag or said at least one modified time marker can likewise be inserted into the data stream prior to the transmission step.

For example, the time lag or said at least one time marker is inserted by replacing a padding packet of said data stream with a dummy packet prior to the transmission step.

According to an alternative, the time lag or said at least one time marker is inserted by replacing a padding packet of said data stream with a packet the signalling of which does not modify the nature of the stream, i.e., the final service associated with the stream.

In particular, this or these marking-specific packets inserted into the stream prior to transmitting can be filtered before extracting the time markers, i.e., at the level of each transmitter, e.g., by overwriting these packets again with a padding packet.

It may be noted that this filtering of the marking-specific packets is deterministic. Thus, within the framework of an SFN-type network, it does not modify the SFN aspect of the broadcasted signal.

According to one particular aspect of an embodiment of the invention, the data frames are organised into mega-frames, each mega-frame including a time marker, and the time marker is a mega-frame initialisation packet (MIP).

This thus falls within the context of transmitting an MPEG-TS type data stream, primarily within the field of DVB-T or DVB-H type broadcasting networks.

The network is preferably an SFN-type network, wherein each of said transmitters uses a single transmitting frequency.

An embodiment of the invention likewise relates to a computer program product downloadable from a communication network and/or recorded on a machine-readable medium and or executable by a processor including program code instructions for implementing the above-described broadcasting method.

Another embodiment of the invention relates to a head-end supplying at least two separate transmitters, in a data stream broadcasting network, said data stream being organised into data frames and including at least one time marker.

According to an embodiment of the invention, the head-end includes:
- means of obtaining a first time reference from an external source;
- means of obtaining a second time reference from said data stream received by said head-end;
- means of comparing said first and second time references so as to determine a time lag between said first and second time references; and
- means of transmitting the time lag or at least one time marker modified on the basis of the time lag, so as to compensate for a variation in transport time between said head-end and said transmitters.

Such a head-end is particularly suitable for implementing the above-described broadcasting method.

In particular, such a head-end includes means of modifying said time marker or markers, based on the result of said comparison.

In this case, the means of comparing and the means of modifying the time marker or markers can be included in an SFN-type adapter.

Yet another aspect of an embodiment of the invention relates to a system of transmitting a data stream in a network including at least one head-end supplying at least two separate transmitters, said data stream being organised into data frames and including at least one time marker, in which:
said at least one head-end includes:
- means of obtaining a first time reference from an external source;
- means of obtaining a second time reference from said data stream received by said head-end;
- means of comparing said first and second time references so as to determine a time lag between said first and second time references;
- means of transmitting said time lag or at least one time marker modified on the basis of the time lag;
at least one of said transmitters includes:
- means of receiving said data stream and said time lag, or said data stream including at least one modified time marker;
- means of determining a time reference from said external source;
- means of synchronising said data stream using said time reference;
- means of retransmitting said data stream;
and at least another one of said transmitters includes:
- means of receiving said data stream and said time lag, or said data stream including at least one modified time marker;
- means of determining said second time reference from said data stream;
- means of synchronising said data stream using said second time reference;
- means of retransmitting said data stream;
so that said data streams transmitted by each of said transmitters are synchronised.

The proposed technique thus enables the use, within a single broadcasting network, of both transmitters using a time reference derived from a reliable source, and transmitters using a time reference derived from the data stream.

BRIEF DESCRIPTION OF THE DRAWINGS

Other characteristics and advantages will become more clearly apparent upon reading the following description of a particular embodiment, which is given for illustrative and non-limiting purposes only, and from the appended drawings, in which.

DETAILED DESCRIPTION OF ILLUSTRATIVE EMBODIMENTS

1. General Principle

The general principle of an embodiment of the invention is based on the head-end side determination of a time lag between two time references obtained according to different techniques, and on the transmission of a time marker that has been directly modified in the data stream transmitted by the head-end in order to account for this lag, or else on the transmission of this time lag to the various network transmitters, in order for the transmitters to modify their local time reference according to this lag.

In other words, taking account of this time lag makes it possible to compensate for the variations in transport time between the head-end and the various transmitting sites, irrespective of the broadcast standard implemented (DVB-T, DVB-T2, DAB, DMB, WIMAX . . . ).

Figure 3:
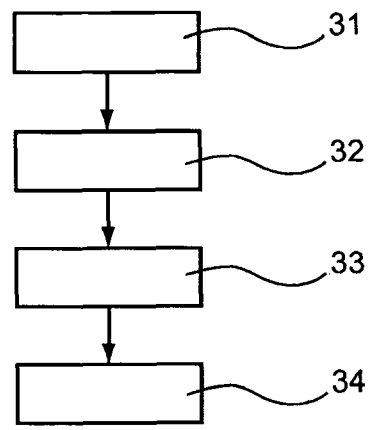
FIG. 3 shows the principal steps of the broadcasting method according to an embodiment of the invention.

FIG. 3 shows the general principle of an embodiment of the invention more precisely, as implemented in a communication network including at least two separate transmitters supplied by a head-end.

During a first step 31, the head-end receives as input, in the one hand, the data to broadcast, and, on the other hand, a first time reference obtained from an external source, such as a GPS receiver. It organises the data into frames, and inserts at least one time marker into the data stream. The stream thus marked is then transported to various transmitting sites, by means of a satellite link, for example.

During step 32, the head-end receives the satellite-transported data stream. A second time reference is obtained from the time marker or markers present in this stream.

The first and second time references are next compared during step 33, thereby making it possible to determine a time lag between the first and second time references.

Finally, during step 34, this time lag is transmitted to the various transmitters, or else taken into account in modifying the time marker or markers later in the data stream transported to the various transmitting sites.

More precisely, modifying the time markers makes it possible, at the head-end level, to compensate for the movement of the satellite, so as to emulate reception by the transmitters. It is likewise possible to transmit this time lag to the various transmitters, which will be able to modify the local time reference thereof on the basis of this lag. In particular, these transmitters can be of various types, some using a reliable external source to generate a time reference (of the GPS type), others regenerating the time reference from the data stream received, and therefore not requiring the use of an external, GPS-type reference.

This technique thus makes it possible to compensate for the variations in transport time between the head-end and the various transmitting sites.

Effort is made hereinbelow to describe various embodiments of the invention, within the framework of SFN-type digital terrestrial television broadcasting, which implements MPEG format data broadcasting.

2. Regeneration of the Time and Frequency References

As indicated previously, an embodiment of the invention finds application in particular in broadcasting systems including transmitters of various types, some using a reliable external source to generate a time reference, and others regenerating the time reference from the data stream received.

A technique is introduced hereinbelow for regenerating 1 pps time and 10 MHz frequency references from the MPEG data stream received. This technique can be implemented at the head-end level, or at the level of the transmitters of the transmitting sites.

A. Time Reference

Figure 4A:
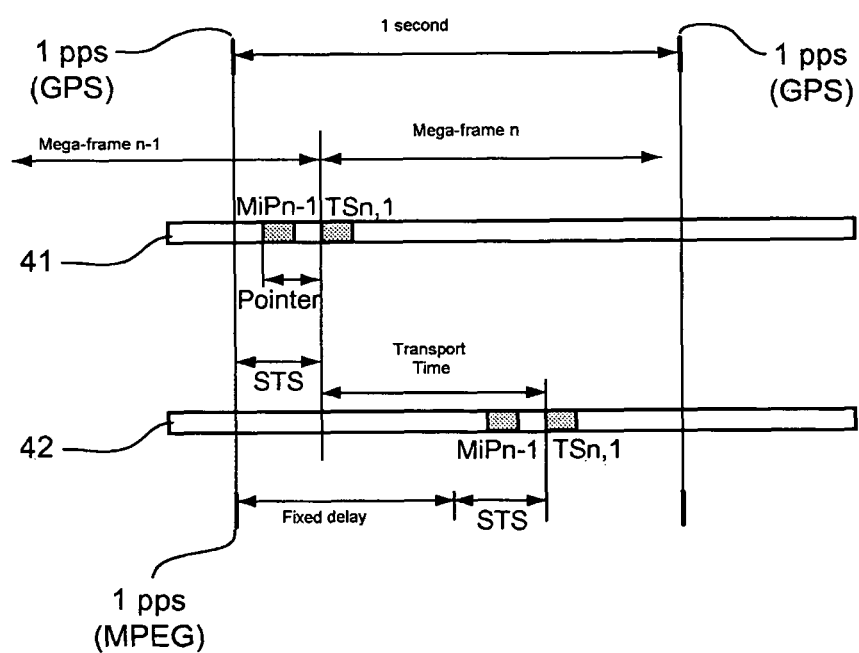
FIGS. 4A and 4B show the regenerating of a time reference from the MPEG data stream.

The assumption is first made of a known and constant transport time (delay) between the head-end and a transmitting site, as shown in FIG. 4A.

In doing so, it is considered that the head-end organises the data to broadcast into mega-frames while taking account of a 1 pps time reference derived from a reliable source of the GPS type, referenced as 1 pps (GPS), and at least one time marker in the form of an MIP packet is inserted into the data stream. The stream thus marked, which is referenced as 41, is then transported to the various transmitting sites.

At the transmitting site (or head-end), the transmitter receives the MPEG stream 42 which was transported in the network.

The transmitter searches for the $MIP_{n-1}$ packet.

Having found the $MIP_{n-1}$ packet, and owing to the "pointer" value, it finds the first TS packet of the following mega-frame n, referenced as $TS_{n,1}$. The transmitter also extracts the STS value from the MIP packet.

Having found the first $TS_{n,1}$ packet, the transmitter regenerates the 1 pps time reference (referenced as 1 pps (MPEG)), owing to the STS value and to the fixed-delay value, which is considered to be equal to the known and constant transport time.

In other words, the transmitter regenerates a 1 pps time reference at the transmitting site or head-end by assigning the transport time, considered to be constant, to the fixed delay. A pulse (1 pps) is thus considered to occur at the moment defined by the receipt of the first bit of the first TS packet of the mega-frame following the $MIP_{n-1}$ packet, minus the time defined by the STS value, minus the fixed delay corresponding to the transport time.

According to this technique, the 1 pps (MPEG) reference time regenerated by the transmitter is therefore synchronised with the 1 pps (GPS) reference time derived from a reliable source.

The assumption is now made that the transport time between the head-end and the transmitting site is unknown or variable, which means that the value of the fixed delay is no longer equal to the transport time.

Figure 4B:
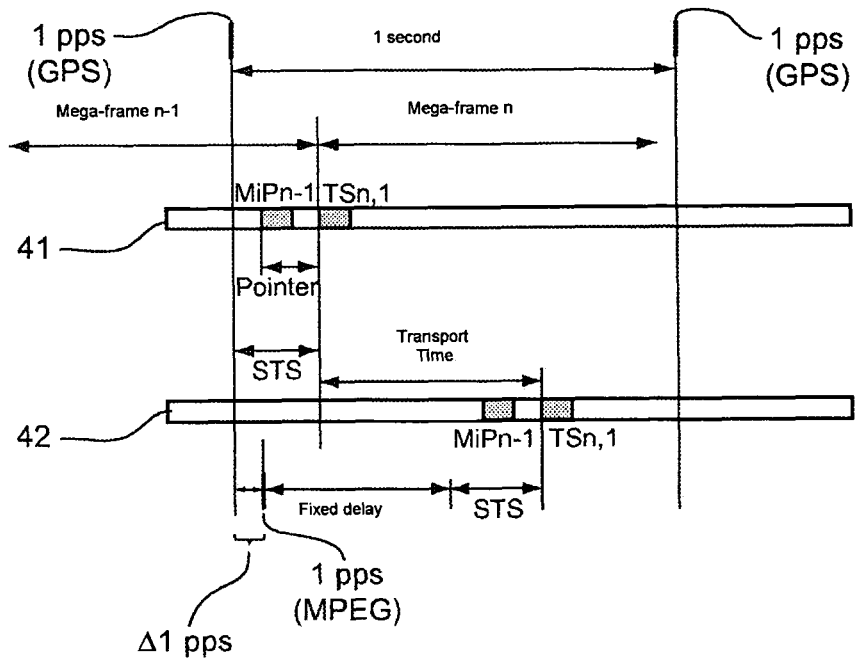

Under this assumption, as shown in FIG. 4B, the 1 pps (MPEG) reference time regenerated by the transmitter is not synchronised with the 1 pps (GPS) time reference derived from a reliable source.

A time lag Δ1 pps therefore exists between the 1 pps (MPEG) time reference and the 1 pps (GPS) time reference.

B. Frequency Reference

The 10 MHz frequency reference is reconstructed from the MPEG stream flow rate. As a matter of fact, it is recalled that the stream flow rate was calibrated at the head-end by the SFN adapter, according to a 10 MHz frequency reference derived from a reliable source, such as a GPS receiver. More precisely, the 10 MHz frequency reference is generated from the MPEG stream at the transmitting sites, owing to a voltage-controlled oscillator (VCO).

Figure 5:
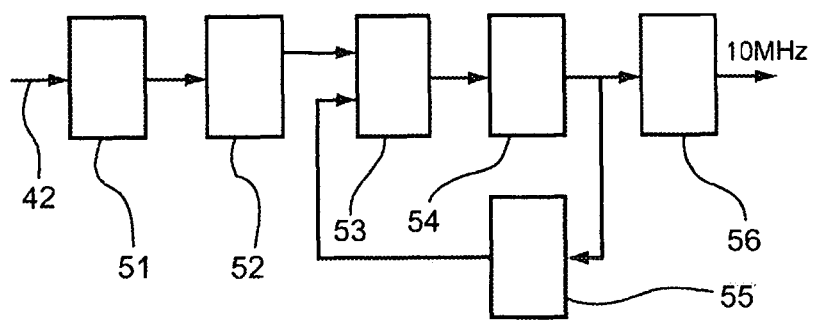
FIG. 5 shows a technique for regenerating a frequency reference from the MPEG data stream.

For example, FIG. 5 shows the principal steps for generating a 10 MHz reference from the data stream 42. For example, it is considered that this stream has a flow rate of 24.130 megabits per second. The generation of a 10 MHz reference implements the following steps:

series/parallel conversion (51);
division (52) by 36;
phase comparison (53) between the signal derived from the VCO (54) divided (55) by 110, and the data stream divided (52) by 36;
amplification (56).

If there is no jitter in the flow rate of the MPEG stream received, the 10 MHz frequency reference is very precisely at the same frequency as the 10 MHz frequency reference derived from a GPS receiver.

In order for there to be exactly 10,000,000 periods of the 10 MHz reference between two 1 pps pulses, it is likewise possible, according to an alternative, to use the principle set forth in FIG. 4 only to "initialise" the 1 pps time reference. The latter could next be maintained using the 10 MHz frequency reference regenerated according to the stream flow rate.

3. First Embodiment

Figure 6:
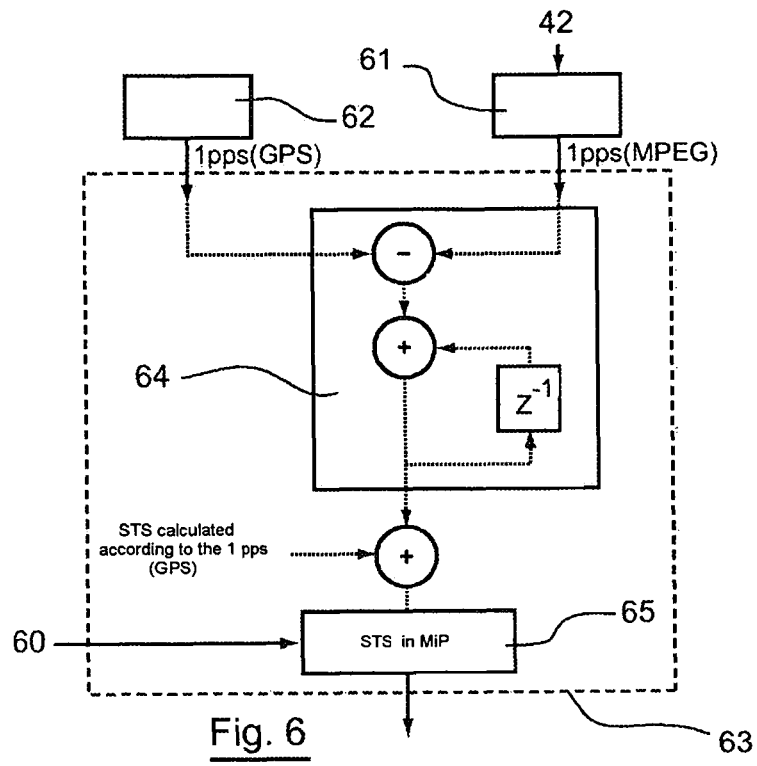
FIGS. 6 and 7 propose a block diagram of a head-end and a time diagram showing a first embodiment of the invention.

A first embodiment of the invention is introduced below in connection with FIGS. 6 and 7, using the above-stated principle for regenerating the time and frequency references.

According to this first embodiment, the head-end includes:

satellite receiving means, like those present at the transmitting sites (RX Network adapter), thereby making it possible to follow the variations in transport time associated with the movements of the satellite. These means enable the MPEG stream 42 to be received at the head-end;

a module 61 for regenerating the 1 pps reference from the MPEG stream 42, referenced as 1 pps (MPEG), according to the technique described in "Regeneration of the time and frequency references";

a GPS receiver 62, making it possible to recover a 1 pps time reference, referenced as 1 pps (GPS); and means of comparing 64 the two time references 1 pps (MPEG) and 1 pps (GPS).

According to this first embodiment, the comparison means belong to the SFN adapter 63. Therefore, in addition to the conventional inputs for the data to broadcast 60, on the one hand, and for a first time reference (1 pps (GPS)) and a first frequency reference (10 MHz (GPS)) on the other hand, the SFN adapter 63 includes an additional input for a second time reference (1 pps (MPEG)).

These comparison means 64 enable the variation in transport time to be measured at the head-end, i.e., the time lag Δ1 pps between the time reference 1 pps (MPEG) and the time reference 1 pps (GPS).

More precisely, during a first initialisation phase, the data stream to broadcast is organised into mega-frames including one or more MIP packets. These MIP packets bear a synchronisation time stamp STS, which is calculated according to the 1 pps time reference derived from the GPS receiver 62. The data stream 41 thus constructed is distributed in the transport network.

During a second operating phase, the transported data stream, then referenced as 42, is received by the satellite receiving means of the head-end. The module 61 then enables the time reference 1 pps (MPEG) to be regenerated from the MPEG stream 42.

The comparison means 64 then compare the time reference 1 pps (MPEG) and the time reference 1 pps (GPS), thereby determining the time lag Δ1 pps between these two references.

When the data is being framed, the SFN adapter 63 modifies the STS value 65 in the MIP packets, while taking account of this time lag Δ1 pps. In other words, the value of the STS stamp, which was previously calculated according to the time reference 1 pps (GPS), is modified by adding the time lag to it, such that:

$$STS'=STS+\Delta 1 \text{ pps.}$$

This new STS' value, is inserted into the MIP packets, in module 65. This time lag is therefore taken into account in order to modify the time marker or markers in the data stream sequence transported towards the various transmitting sites.

Figure 7:
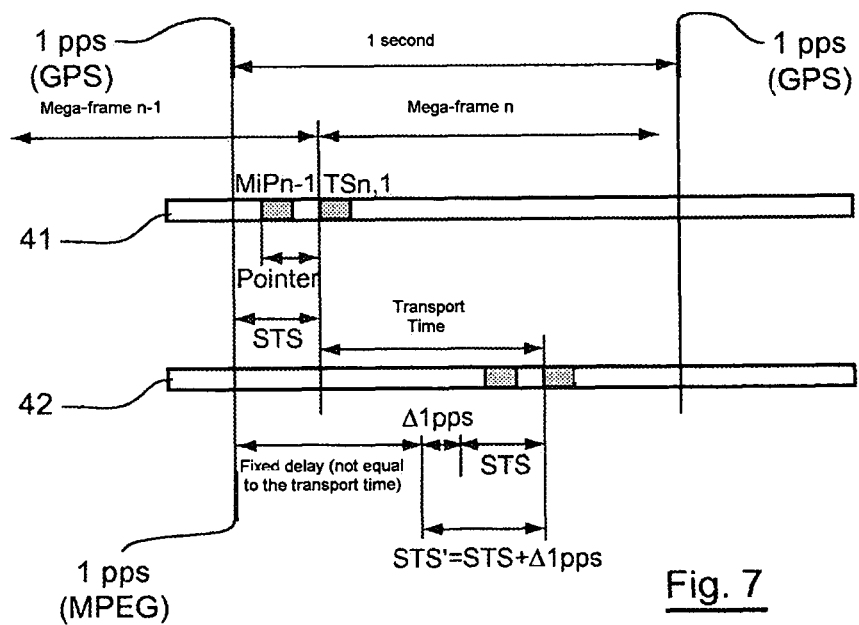

In this way, as shown in FIG. 7, the time reference 1 pps (MPEG) regenerated at the transmitting sites from the MPEG stream including the markers modified according to the above-described technique, is synchronised with the reference 1 pps (GPS).

More precisely, at the transmitting sites, the first bit of the mega-frame following the current MIP packet is not broadcasted by the transmitter at the moment defined by the 1 pps pulse, to which the STS value and the delay Max_Delay are added, but at the moment defined by the 1 pps pulse to which the STS' value and the delay Max_Delay are added (i.e., 1 pps+STS+Δ1 pps(t)+Max_Delay). Since this variation is the same for all of the transmitters of the SFN network, the broadcasted signals remain well-synchronised.

In particular, the comparison means 64 can regularly calculate the adjustment Δ1 pps to be made in the STS value using the following recurrence formula:

$$\Delta 1 \text{ pps}(n+1)=\Delta 1 \text{ pps}(n)+\text{measured instantaneous deviation, where } n \text{ corresponds to the index of the mega-frame.}$$

In other words, the adjustment Δ1 pps(n+1) to be made in the mega-frame n+1 is equal to the adjustment Δ1 pps(n) which was made in the mega-frame n, to which the measured instantaneous deviation is added (i.e., the deviation which was still remaining after having made the adjustment Δ1 pps(n)). Let it be noted that when the measured instantaneous deviation is zero, that means that the time lag Δ1 pps between the time references 1 pps (GPS) and 1 pps (MPEG) has been calculated correctly and that, after applying the correction, the references 1 pps (GPS) and 1 pps (MPEG) are synchronised.

The time reference 1 pps generated from the MPEG signal is therefore correctly synchronised with the time reference 1 pps derived from the GPS.

This solution therefore enables the variation in the transport time of the MPEG stream to be compensated. Furthermore, the SFN adapter operates with 1 pps and optionally 10 MHz references derived from a reliable GPS-type receiver. The proper operation of same is therefore ensured. In particular, it may be noted that there are exactly 10 million periods of the 10 MHz reference between two 1 pps pulses.

Within the same broadcasting network, it is therefore possible to use both transmitters using a time reference derived from a reliable GPS-type source and transmitters using a time reference derived from the MPEG stream.

4. Second Embodiment

Figure 8:
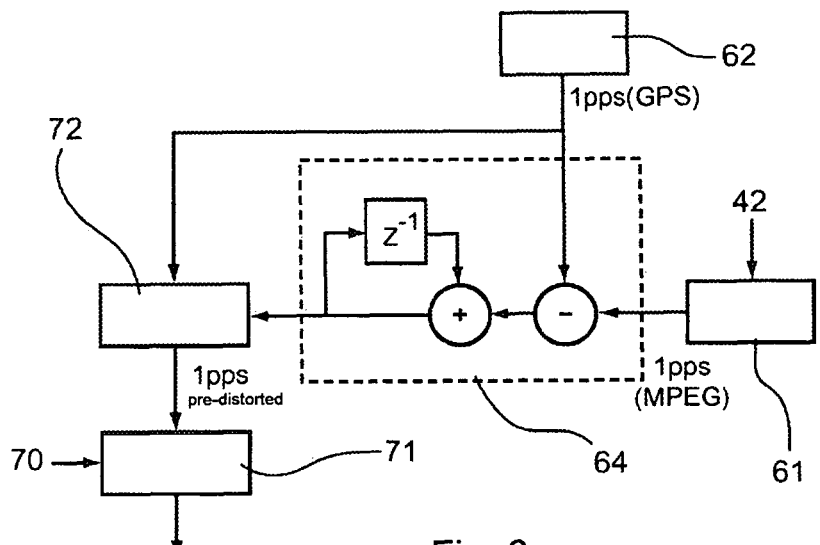
FIGS. 8 and 9 propose a block diagram of a head-end and a time diagram showing a second embodiment of the invention.

A second embodiment of the invention is presented below in connection with FIGS. 8 and 9.

According to this embodiment, the head-end includes:
satellite receiving means enabling the MPEG stream 42 to be received;
a module 61 for regenerating the 1 pps reference from the MPEG stream 42;
a GPS receiver 62; and
means of comparing (64) the two time references 1 pps (MPEG) and 1 pps (GPS).

According to this second embodiment, the comparison means (64) enable the variation in transport to be measured at the head-end, i.e., the time lag Δ1 pps between the time reference 1 pps (MPEG) and the time reference 1 pps (GPS).

This time lag is next added to the first time reference 1 pps (GPS). In other words, according to this second embodiment, the head-end includes means 72 of pre-distorting the first time reference, thereby delivering a pre-distorted 1 pps time reference.

It is recalled that the SFN adapter 71 conventionally includes three inputs, one for the data to broadcast, and the two other one for the time and frequency references.

According to this embodiment, the SFN adapter 71 is a conventional adapter, including a first input for the data to broadcast 70, a second input for the 10 MHz frequency reference, and a third input for the pre-distorted 1 pps time reference.

It is this pre-distorted reference which is used to modify the STS time stamp in the MIP packets.

More precisely, during a first initialisation phase, the data stream to broadcast is organised into mega-frames, including one or more MIP packets, as described for the first embodiment.

During a second operating phase, the transported data stream, which is then referenced as 42, is received by the satellite receiving means of the head-end. The module 61 then enables the time reference 1 pps (MPEG) to be regenerated from the MPEG stream 42.

The comparison means (64) then compare the time reference 1 pps (MPEG) and the time reference 1 pps (GPS), thereby determining the time lag Δ1 pps between these two references.

The time reference 1 pps (GPS) is then modified (72) by taking account of this time lag, thereby delivering a pre-distorted 1 pps time reference:

1 pps pre-distorted=1 pps(GPS)+Δ1 pps

When the data is being framed, the SFN adapter 71 determines an STS' value from this pre-distorted 1 pps time reference, and changes the STS value in the MIP packets to STS'.

Figure 9:
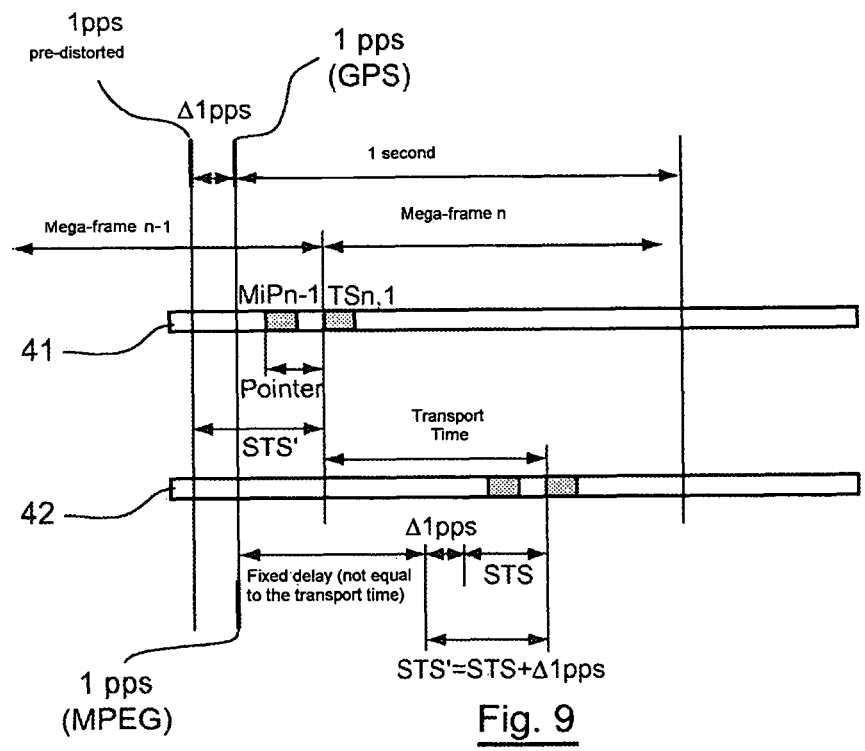

Thus, as shown in FIG. 9, the time reference 1 pps (MPEG) regenerated at the transmitting sites from the MPEG stream including the markers modified according to the above-described technique, is synchronised with the reference 1 pps (GPS).

In particular, as introduced in connection with the first embodiment, the comparison means (64) can regularly calculate the adjustment Δ1 pps to be made in the reference 1 pps (GPS), using the following recurrence formula:

Δ1 pps(n+1)=Δ1 pps(n)+measured instantaneous deviation.

The 1 pps time reference generated from the MPEG signal is therefore correctly synchronised with the 1 pps time reference derived from the GPS.

This second solution makes it possible to compensate for the variation in transport time of the MPEG stream. Within the same broadcasting network, it is therefore possible to use both transmitters using a time reference derived from a reliable GPS-type source and transmitters using a time reference derived from the MPEG stream.

5. Third Embodiment

Figure 10:
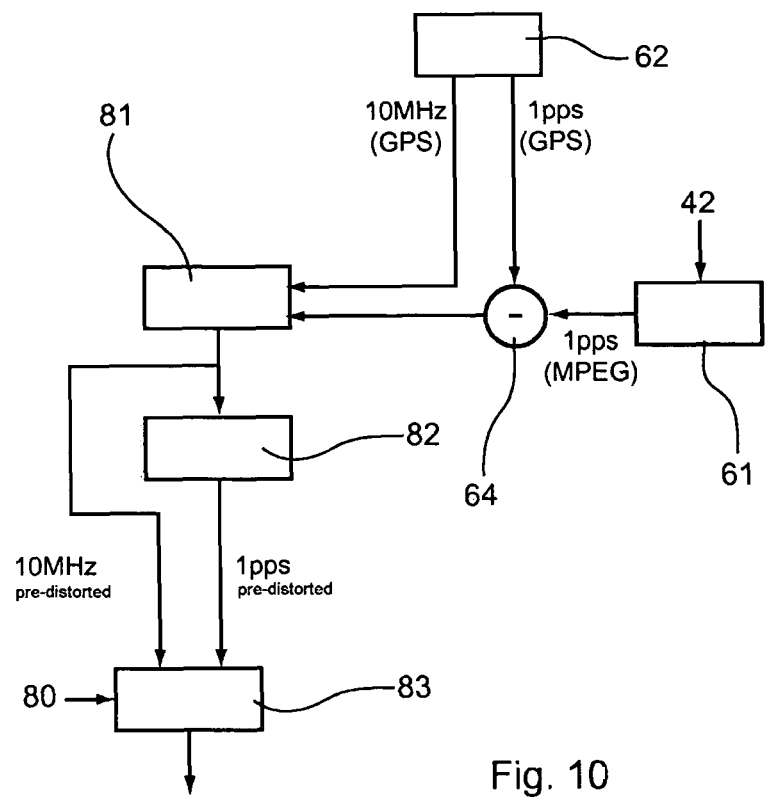
FIG. 10 shows a block diagram of a head-end according to a third embodiment of the invention.

A third embodiment of the invention is now introduced in connection with FIG. 10.

According to this embodiment, the head-end includes:
satellite receiving means enabling the MPEG stream 42 to be received;
a module 61 for regenerating the 1 pps reference from the MPEG stream 42;
a GPS receiver 62; and
means of comparing (64) the two time references 1 pps (MPEG) and 1 pps (GPS).

According to this third embodiment, the comparison means (64) enable the variation in transport time to be measured at the head-end, i.e., the time lag Δ1 pps between the reference time 1 pps (MPEG) and the reference time 1 pps (GPS).

This time lag Δ1 pps is used to generate a pre-distorted 10 MHz frequency reference in a module 81. More precisely, the module 81 receives at the input thereof the 10 MHz frequency reference derived from the GPS receiver and the time lag Δ1 pps, pre-distorts the 10 MHz frequency reference (GPS) while taking account of this lag, and delivers a pre-distorted 10 MHz frequency reference.

This pre-distorted 10 MHz reference, for example, can be obtained by using a phase-locked loop (or PLL) the voltage control of which is driven by the time lag Δ1 pps. In a first phase, the PLL can be slaved to the 10 MHz reference derived from the GPS. Then, once this slaving has been achieved, the control voltage of the PLL (VCO) is increased or decreased depending on the value of the time lag Δ1 pps, so as to minimise it, thereby leading to an increase or decrease in the 10 MHz frequency.

Knowing that there are exactly 10 million periods of the 10 MHz frequency reference between two 1 pps pulses, a pre-distorted 1 pps time reference is regenerated in a module 82, from the pre-distorted 10 MHz frequency reference.

The SFN adapter 83, which is a conventional adapter, then includes inputs for the data to broadcast 80, the pre-distorted 1 pps time reference, and the pre-distorted 10 MHz frequency reference.

It is this pre-distorted time reference which is used to modify the STS time stamp in the MIP packets.

More precisely, as already indicated for the other embodiments, the data stream to broadcast is organised into mega-frames, including one or more MIP packets, during a first initialisation phase.

During a second operating phase, the transported data stream, which is then referenced as 42, is received by the satellite receiving means of the head-end. The module 61 then enables the time reference 1 pps (MPEG) to be regenerated from the MPEG stream 42.

The comparison means (64) then compare the time reference 1 pps (MPEG) and the time reference 1 pps (GPS), thereby determining the time lag Δ1 pps between these two references.

The 10 MHz frequency reference derived from the GPS is then frequency-slaved using this time lag Δ1 pps (81), thereby delivering a pre-distorted 10 MHz frequency reference and a pre-distorted 1 pps time reference.

When the data is being framed, the SFN adapter 83 determines an STS' value from this pre-distorted 1 pps time reference, and changes the STS value in the MIP packets to STS'.

The 1 pps time reference generated from the MPEG signal is therefore correctly synchronised with the 1 pps time reference derived from the GPS.

This third solution therefore makes it possible to compensate for the variation in transport time of the MPEG stream, as well as the frequency deviation of the 10 MHz frequency reference due to the Doppler effect.

In particular, it may be noted that the 1 pps time and 10 MHz frequency references supplied to the SFN adapter 83 are related, which means that there are exactly 10 million periods of the 10 MHz frequency reference between two 1 pps pulses.

Within the same broadcasting network, it is therefore possible to use both transmitters using a time reference derived from a reliable GPS-type source and transmitters using a time reference derived from the MPEG stream, by carrying forward the variation in the transport time period onto the modulated signal broadcasted by the transmitters.

As a matter of fact, the first bit of the mega-frame following the current MIP packet is not broadcasted by the transmitter at the moment defined by the 1 pps pulse, to which the STS value and the Max_Delay are added, but at the moment defined by the 1 pps pulse to which the STS' value and the Max_Delay are added (i.e., 1 pps+STS+Δ1 pps(t)+Max_Delay).

6. Fourth Embodiment

A fourth embodiment is introduced, under the assumption that one does not wish to modify the time markers in the data stream.

This embodiment enables the two time references, and optionally the frequency references, to be synchronised, without causing any distortion of the reference derived from the external source. As described above, this fourth embodiment enables the time lag between a time reference supplied by an external source and a time reference supplied by the data stream to be measured at the head-end.

According to this fourth embodiment, this time lag is transmitted directly to the various transmitters. In this way, according to this embodiment, the transmitters present at the transmitting sites include means of obtaining this time lag, and of modifying their local time reference in order to account for this lag.

Three alternative embodiments are identified hereinbelow.

Figure 11:
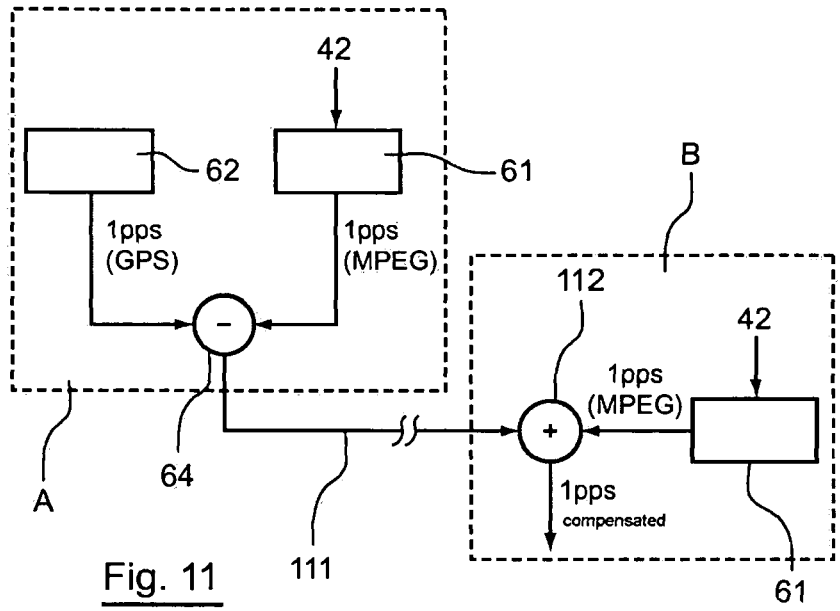
FIGS. 11 and 12 show a block diagram of a head-end and a transmitter at a transmitting site according to a fourth embodiment of the invention.

According to a first alternative, as shown in FIG. 11, the head-end A includes:

satellite receiving means enabling the MPEG stream 42 to be received;

a module 61 for regenerating the 1 pps reference from the MPEG stream 42, referenced as 1 pps (MPEG), according to the technique described in "Regeneration of the time and frequency references";

a GPS receiver 62, making it possible to recover a 1 pps time reference, referenced as 1 pps (GPS); and means of comparing (64) the two time references 1 pps (MPEG) and 1 pps (GPS).

According to this first alternative, the time lag between the time references 1 pps (MPEG) and 1 pps (GPS), which is derived from the comparison means 64, is transmitted to at least one transmitting site B, by using an external transmitting means 111.

This external transmitting means 111, for example, is a GPRS link or an IP transmission.

At the transmitting sites B, the MPEG stream 42 is used to regenerate the 1 pps reference, according to the technique described in "Regeneration of the time and frequency references".

The time lag obtained at the transmitting site is then added (112) to the 1 pps (MPEG) signal regenerated at the transmitting site, which corresponds to the local time reference. A compensated 1 pps time reference is thus obtained. In other words, the time reference 1 pps (MPEG) is aligned with an external time reference (e.g., 1 pps (GPS)), by compensating for the time lag $\Delta 1$ pps.

In order for this alternative to function efficiently, it is desirable to transmit this time lag value to each of the broadcasting sites several times per day.

Figure 12:
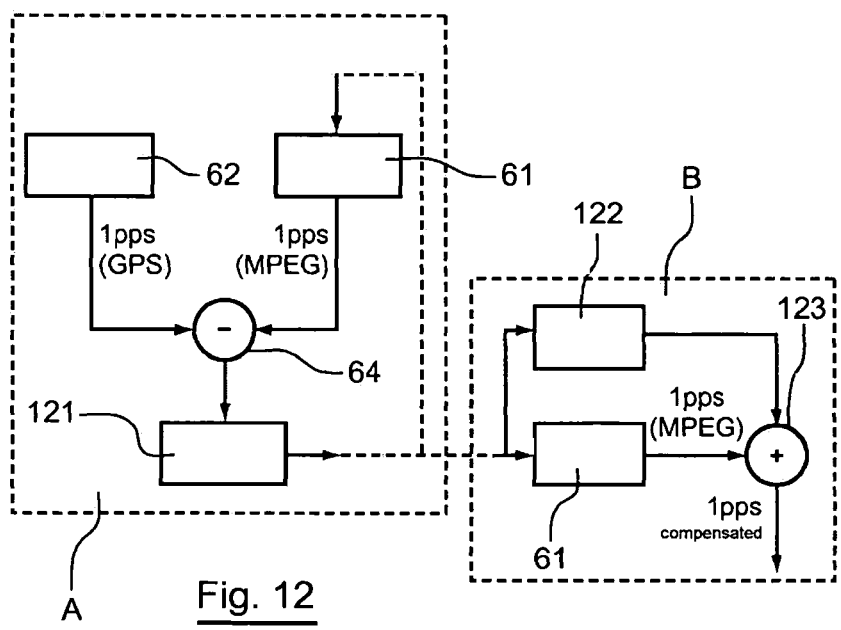

According to a second alternative, as shown in FIG. 12, the head-end A, in addition to the elements mentioned in connection with the first alternative, includes means 121 of modifying the data stream.

These means 121 enable the time lag derived from the comparison means 64 to be inserted into the data stream being broadcasted.

More precisely, this time lag is inserted into a TS packet having a dedicated PID, i.e., a dedicated TS packet identifier. For example, this time lag is inserted by replacing a padding packet of the stream with a packet identified by a dummy PID, i.e., a packet with a PID which is not described in the tables and which is not set forth in the standard. According to an alternative, this time lag is inserted by replacing a padding packet of the stream with a packet the signalling of which does not modify the nature of the signal being broadcasted.

According to this alternative, it is considered that the transmitter knows the marking-specific packets carrying the time lag (dummy PIDs or packets the signalling of which does not modify the nature of the signal being broadcasted).

It is likewise possible to insert several time lag values into the stream by introducing marking-specific packets into each of the mega-frames.

This insertion step, for example, is implemented by a slightly modified MIP inserter.

The MPEG stream received is used at the transmitting sites B in order to regenerate the 1 pps reference, according to the technique described in "Regeneration of the time and frequency references".

An extraction module 122 is likewise provided, which enables the time lag measured at head-end to be extracted from the marking-specific packets.

The extracted time lag is then added (123) to the 1 pps (MPEG) signal regenerated at the transmitting sites, thereby delivering a compensated 1 pps time reference.

The time reference 1 pps (MPEG) is then aligned with the time reference 1 pps (GPS), by compensating for the time lag $\Delta 1$ pps.

It may likewise be noted that the marking-dedicated TS packet is processed transparently by the modulators (e.g., referenced as 102 and 112 in connection with FIG. 1) at the transmitting sites B.

According to a third alternative, it is likewise possible to insert one or more modified time markers, as described in connection with the first three embodiments, into one or more marking-specific TS packets. For example, these marking-specific packets are identified by a dummy PID or a packet the signalling of which does not modify the nature of the signal to broadcast.

In this way, marking-specific packets are created (e.g., dummy MIPs), which, for example, have an STS' value (STS'=STS+$\Delta 1$ pps), and which coexist in the data stream with the "conventional" MIP packets having an STS value.

This insertion step, for example, is implemented by a slightly modified MIP inserter, which enables the insertion of marking-specific packets into the MPEG stream.

Figure 1:
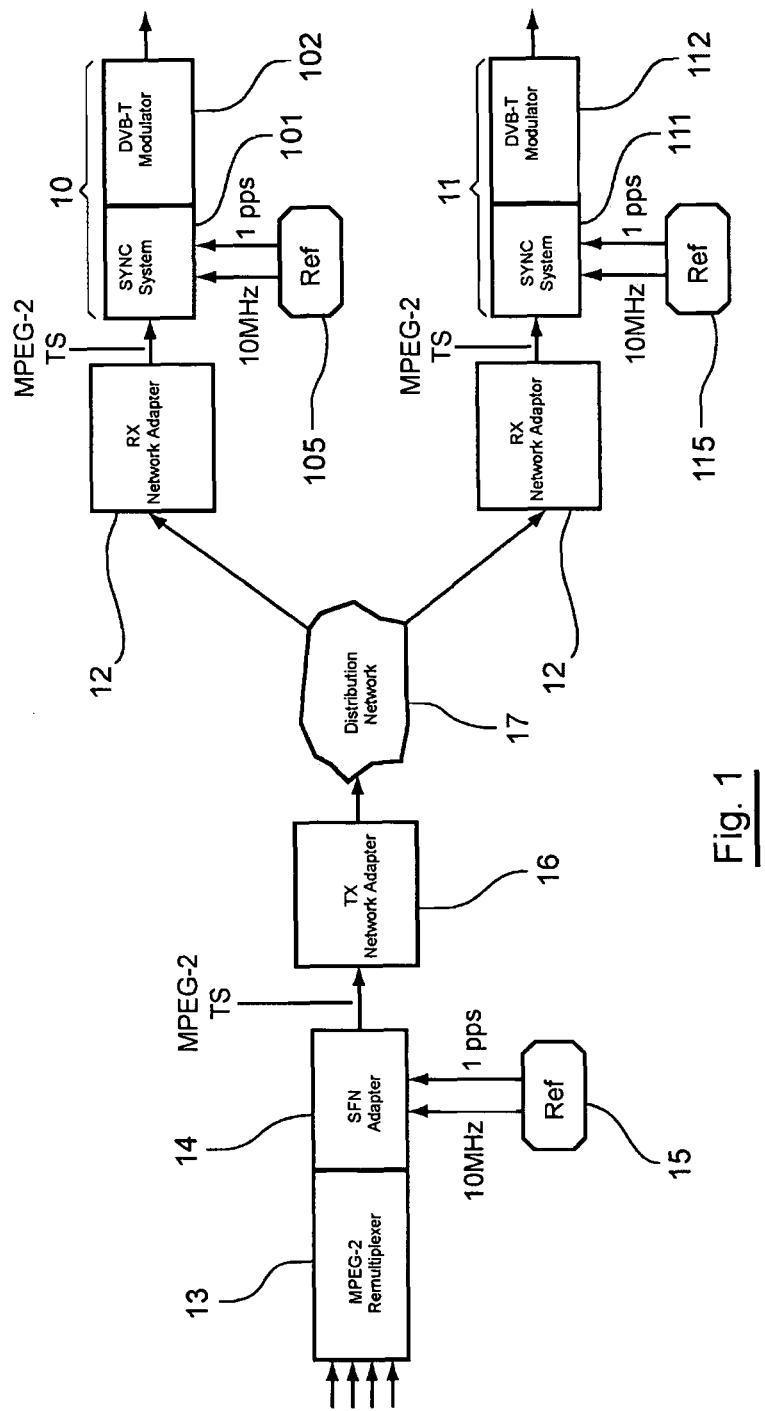
FIG. 1, which has already been described in connection with the prior art, shows a block diagram of an SFN-type digital terrestrial television broadcasting system implementing MPEG-2 format data broadcasting.
Figure 2:
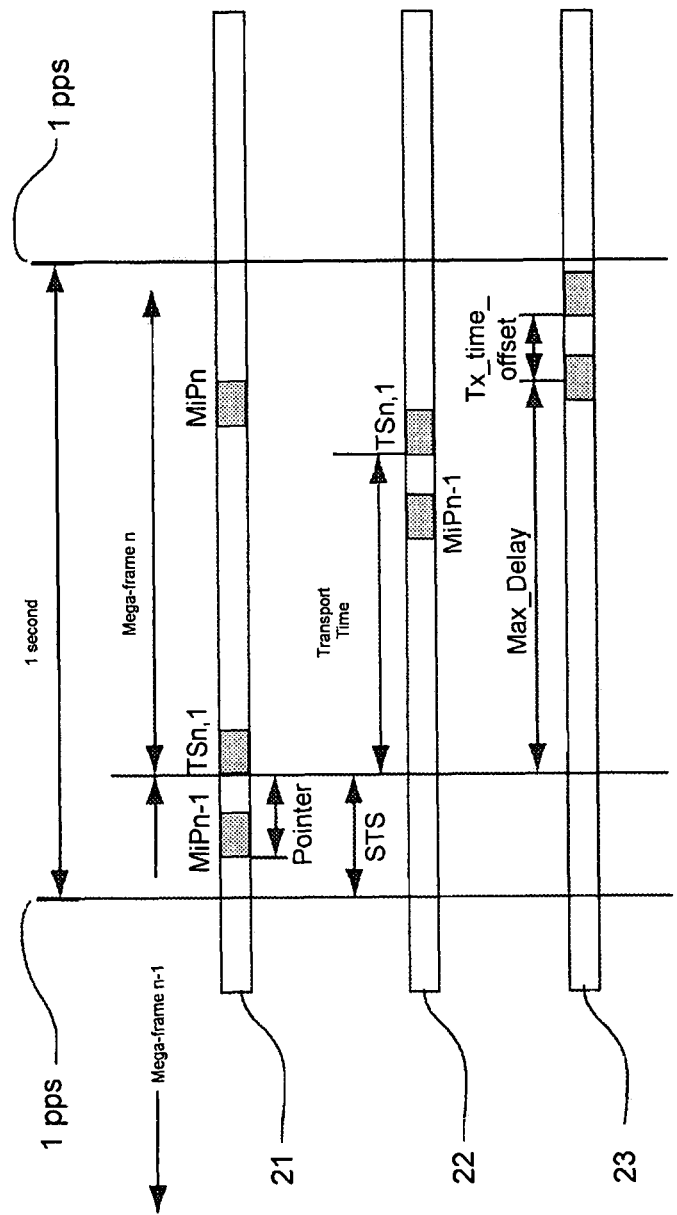
FIG. 2, also describes in connection with the prior art, illustrates the principle of SFN synchronisation in the form of a time diagram, as implemented in the system of FIG. 1.

The data stream transported from the head-end to the various transmitters therefore possesses a dual MIP marking:

the "conventional" MIP marking used by the modulators (e.g., referenced as 102 and 112 in connection with FIG. 1);

the specific MIP marking, which is transparent for the modulators, and which is used only during synchronisation of the system in the transmitting stations in order to generate a 1 pps reference aligned with the 1 pps reference derived from a reliable (GPS) source.

For example, it is possible to indicate to the transmitter (to the synchronisation equipment, for example) the PID of the dummy MIP packets that it must use in order to regenerate its 1 pps reference.

At the transmitting stations, it is also possible to insert, between the TS stream derived from the satellite reception and the "1 pps-10 MHz regenerator," a module which inverts the PIDs of the conventional MIP packets and the dummy MIP packets.

In particular, the marking-specific packets inserted into the stream prior to transmission can be filtered before extracting the "conventional" MIP time markers, i.e., at the level of each transmitter, e.g., by overwriting this or these marking-specific packet or packets with a padding packet.

It may be noted that this filtering of the marking-specific packets is deterministic. In this way, within the framework of an SFN-type network, it does not modify the SFN aspect of the broadcasted signal.

Thus, the time reference 1 pps (MPEG) regenerated from the data stream will be determined from the time markers having the value STS'. The time reference 1 pps (MPEG) is thus aligned with the external time reference (e.g., 1 pps (GPS)).

7. Structure of the Head-End

Figure 13:
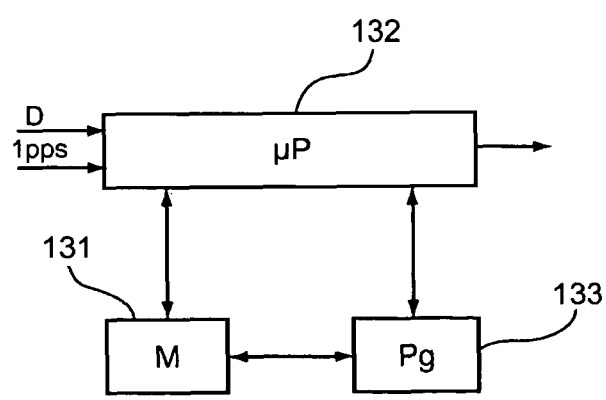
FIG. 13 shows the simplified structure of a head-end implementing the broadcasting method according to a particular embodiment of the invention.

The simplified structure of a head-end implementing a broadcasting method according to one of the particular embodiments described above will now be introduced in connection with FIG. 13.

Such a head-end includes a memory 131, a processing unit 132, which, for example, is equipped with a microprocessor μP, and driven by the computer program 133 implementing the broadcasting method according to an embodiment of the invention.

Upon initialisation, the computer program code instructions 133 are, for example, loaded into a RAM memory prior to being executed by the processor of the processing unit 132. The processing unit 132 receives at the input thereof data to broadcast D, as well as a 1 pps time reference (and optionally a 10 MHz frequency reference). The microprocessor of the processing unit 132 implements the steps of the broadcasting method described above, according to the computer program instructions 133.

To accomplish this, besides the memory 131, the head-end includes means of obtaining a first time reference from an external source, means of obtaining a second time reference from said data stream received by the head-end, means of comparing said first and second time references, and means of transmitting said time lag or at least one of said time markers modified on the basis of said time lag. These means are driven by the microprocessor of the processing unit 132.

The processing unit 132 delivers as output the time lag or the data stream including at least one modified time marker.

Although the present disclosure has been described with reference to one or more examples, workers skilled in the art will recognize that changes may be made in form and detail without departing from the scope of the disclosure and/or the appended claims.

The invention claimed is:

1. A method for broadcasting a data stream in a broadcasting network including at least two separate transmitters supplied by a head-end, said data stream being organised into data frames and including at least one time marker, wherein the method implements the following steps, at the head-end level:
   obtaining a first time reference from an external source;
   obtaining a second time reference from said data stream received by said head-end;
   comparing said first and second time references so as to determine a time lag between said first and second time references; and
   transmitting the time lag or at least one time marker modified on the basis of the time lag, so as to compensate for a variation in transport time between said head-end and said transmitters.

2. The method of claim 1, wherein said broadcasting network is an SFN-type network, and wherein said at least two transmitters use a single transmitting frequency.

3. The method as claimed in claim 1, wherein said time marker bears a synchronisation time stamp (STS).

4. The method of claim 3, wherein said at least one modified time marker has a value representative of said time lag and of said synchronisation time stamp (STS).

5. The method of claim 3, wherein the method includes a step of pre-distorting said first time reference, by adding said time lag thereto,
   and wherein said at least one modified time marker has a value representative of the pre-distorted time reference and said synchronisation time stamp (STS).

6. The method as claimed in claim 1, wherein the method includes a step of obtaining a frequency reference from said first time reference, and a step of pre-distorting said frequency reference, on the basis of said time lag.

7. The method as claimed in claim 6, wherein the method includes:
   a step of determining a pre-distorted time reference from said frequency reference,
   and wherein said at least one modified time marker has a value representative of the pre-distorted time reference and a synchronisation time stamp (STS).

8. The method as claimed in claim 1, wherein said time lag is transmitted to said transmitters via an external transmitting means.

9. The method as claimed in claim 1, wherein said time lag or said at least one modified time marker is inserted into said data stream prior to said transmitting step.

10. The method of claim 9, wherein said time lag or said at least one time marker is inserted by replacing a padding packet of said data stream with a dummy packet or with a packet the signalling of which does not modify the nature of the stream.

11. The method as claimed in claim 1, wherein said data frames are organised into mega-frames, each mega-frame including a time marker, and wherein said time marker is a mega-frame initialisation packet (MIP).

12. A non-transitory machine-readable storage medium comprising a computer program product recorded thereon, wherein the product includes program code instructions for implementing a method of broadcasting a data stream in a broadcasting network including at least two separate transmitters supplied by a head-end, when the instructions are executed by a processor, said data stream being organised into data frames and including at least one time marker, and wherein the method implements the following steps, at the head-end level:
   obtaining a first time reference from an external source;
   obtaining a second time reference from said data stream received by said head-end;
   comparing said first and second time references so as to determine a time lag between said first and second time references; and
   transmitting the time lag or at least one time marker modified on the basis of the time lag, so as to compensate for a variation in transport time between said head-end and said transmitters.

13. A head-end configured to supply at least two separate transmitters, in a data stream broadcasting network, said data stream being organised into data frames and including at least one time marker,
   wherein said head-end comprises:
      a receiver configured for receiving a first time reference from an external source;
      a module configured for regenerating a second time reference from said data stream received by said head-end;
      a comparator configured for comparing said first and second time references so as to determine a time lag between said first and second time references; and
      a transmitter configured for transmitting said time lag or at least one time marker modified on the basis of the time lag, so as to compensate for a variation in transport time between said head-end and said transmitters.

14. The head-end of claim 13, further comprising an SFN-type adapter, wherein said adapter includes said comparator and a mega-frame initialization packet (MIP) inserter configured for modifying at least one time marker, thereby delivering said modified time marker.

15. A system of transmitting a data stream in a network including at least one head-end supplying at least two separate transmitters, said data stream being organised into data frames and including at least one time marker, wherein said at least one head-end includes:
- a receiver configured for receiving a first time reference from an external source;
- a module configured for regenerating a second time reference from said data stream received by said head-end;
- a comparator configured for comparing said first and second time references so as to determine a time lag between said first and second time references;
- a transmitter configured for transmitting said time lag or at least one time marker modified on the basis of the time lag;

and wherein at least one of said at least two separate transmitters includes:
- a receiver configured for receiving said data stream and said time lag, or said data stream including at least one modified time marker;
- a receiver configured for receiving said first time reference from said external source;
- synchronisation equipment configured for synchronising said data stream using said first time reference;
- a modulator configured for retransmitting said data stream;

and wherein at least another one of said at least two separate transmitters includes:
- a receiver configured for receiving said data stream and said time lag, or said data stream including at least one modified time marker;
- a module configured for regenerating said second time reference from said data stream;
- synchronisation equipment configured for synchronising said data stream using said second time reference;
- a modulator configured for retransmitting said data stream;

so that said data streams transmitted by each of said transmitters are synchronised.

* * * * *

UNITED STATES PATENT AND TRADEMARK OFFICE
CERTIFICATE OF CORRECTION

PATENT NO. : 8,683,069 B2  
APPLICATION NO. : 12/735831  
DATED : March 25, 2014  
INVENTOR(S) : Masse et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this

Twenty-ninth Day of September, 2015

Michelle K. Lee
*Director of the United States Patent and Trademark Office*